United States Patent [19]

Glasgow

[11] Patent Number: 4,865,802

[45] Date of Patent: * Sep. 12, 1989

[54] ACCUMULATOR

[75] Inventor: Lyle E. Glasgow, Westlake Village, Calif.

[73] Assignee: Rockwell International Corporation, El Segundo, Calif.

[*] Notice: The portion of the term of this patent subsequent to Mar. 29, 2005 has been disclaimed.

[21] Appl. No.: 64,021

[22] Filed: Jun. 19, 1987

[51] Int. Cl.$^4$ .............................................. G21C 9/00
[52] U.S. Cl. .................................. 376/307; 376/367; 137/206; 165/104.32
[58] Field of Search ................ 376/307, 367; 137/206, 137/207, 207.5; 165/104.26, 104.32, 917

[56] References Cited

U.S. PATENT DOCUMENTS

| | | | |
|---|---|---|---|
| 4,492,266 | 1/1985 | Bizzell et al. | 165/104.26 |
| 4,733,852 | 3/1988 | Glasgow et al. | 137/206 |

Primary Examiner—Deborah L. Kyle
Assistant Examiner—Daniel Wasil
Attorney, Agent, or Firm—H. Frederick Hamann; Harry B. Field

[57] ABSTRACT

A liquid accumulator (28) for use in a substantially zero gravity environment which utilizes the surface tension of a liquid to form a meniscus which acts as a gas-liquid interface providing a barrier to the passage or entrainment of a gas into the liquid. The apparatus includes a plurality of tubes (36) for capillary containment of a liquid, a grid member (34) provided with a plurality of holes (one of each tube) for receiving therein in sealing engagement an end of the tube. An opposite end of each of the tubes contains a gas. The apparatus further includes a housing (30) extending circumferentially about the grid member and defining a liquid zone (38) on the side of said grid member opposite said tubes located within the liquid zone and extending partially into each of the tubes is a body of liquid which forms a meniscus (42) in each of the tubes. Fluid communication is provided between the liquid zone of the apparatus and a source of liquid subject to thermal expansion and contraction.

10 Claims, 1 Drawing Sheet

ACCUMULATOR

BACKGROUND OF THE INVENTION

The present invention broadly relates to an accumulator which allows for the thermal expansion of a fluid. It particularly relates to such an accumulator which allows for the thermal expansion of a liquid metal in a zero gravity environment.

There is currently a major combined effort being made by certain government agencies to develop a high-power, light-weight nuclear reactor power source (SP-100 reactor) for use on future spacecraft. The program will require the resolution of numerous technological challenges. One of those challenges will be to provide a means for allowing for thermal expansion of the liquid metal reactor coolant.

The SP-100 reactor utilizes liquid lithium as a reactor coolant and heat transport medium. The temperature of the reactor coolant may range from as low as ambient prior to initiation of reactor power to as high as 1000° Kelvin at maximum power. In addition the means providing for thermal expansion must be reliable since it must last for many years.

To accommodate the thermal expansion of a liquid in a terrestrial environment is a relatively simple and straightforward matter. Specifically, one need only provide an enclosed vessel having an opening in a lower portion thereof. Gravity will result in the more dense liquid staying in a bottom portion of the vessel and air or gas trapped therein will be an upper portion of the vessel by virtue of its lesser density. As the liquid expands the gas will be compressed. Conversely, as the liquid cools, the gas will expand forcing the liquid back out into the system from which it was drawn.

Providing a liquid accumulator for use in a zero gravity environment, such as would be encountered in space, is not so easy a task. In the absence of a gravity gradient, the gas and liquid would intermingle in a device such as just described with the result that the combination of gas and liquid could be anywhere in the system. If this were allowed to occur, the gas could accumulate as a large bubble anywhere in the system for example in a liquid-cooled, nuclear reactor core and interfere with the heat transport of the liquid metal coolant. Specifically, it could result in overheating and failure of individual fuel pins within the reactor core. Obviously, therefore, some means must be provided to accommodate the increase in volume of liquid metal coolant which results from thermal expansion and it must be accomplished in a manner to insure that there is not entrainment of gas in the liquid metal coolant.

It has been proposed to use a bellows to provide for such thermal expansion. The liquid would be on one side of the bellows and the gas on the other such that the flexible movement of the bellows would accommodate expansion and contraction of the liquid while still maintaining the two physically separated. A disadvantage of this approach is that the flexing of the bellows could result in a structural failure or crack the bellows which could in turn result in mixing of the gas and liquid. In addition, the temperatures which would be encountered by the bellows from the coolant in a space reactor environment are such that it is doubtful if a suitable bellows material would be available.

It also has been proposed to use a piston with seals to maintain a gas and liquid separate, while movement of the piston would accommodate expansion or contraction of the liquid. An obvious disadvantage of this approach is that any failure of the seal would again result in a mixture of the gas and liquid with the attendant risk of overheating and failure of fuel pins within the reactor core.

Thus, there clearly is need for a reliable accumulator to allow for thermal expanson of a liquid metal coolant which would be suitable for use in a substantially zero gravity environment.

OBJECTS OF THE INVENTION

It is an object of the invention to provide an apparatus which will accommodate thermal expansion of a liquid and which utilizes the surface tension of the liquid to maintain a gas liquid interface.

It is another object of the invention to provide an apparatus which will accommodate thermal expansion of a liquid and provide a storage device which utilizes the surface tension of a liquid coolant from a nuclear reactor.

It is still another object of the invention to provide an apparatus which will accommodate thermal expansion of a nuclear reactor coolant which requires no moving parts.

It is still another object of the invention to provide an apparatus which will accommodate thermal expansion of a liquid and maintain a gas-liquid interface in a substantially zero gravity environment.

Another object of the invention is to provide an apparatus for accommodating thermal expansion of a reactor coolant in a space environment which will reliably function for the life of the reactor.

These and other objects of the invention will be more apparent from the drawing and following description thereof.

SUMMARY OF THE INVENTION

The present invention provides an apparatus for accommodating thermal expansion of a liquid utilizing the compression of a gas and further provides for maintaining the gas and liquid separate in a substantially zero gravity environment. The present invention is particularly applicable to allowing for the thermal expansion of a liquid metal coolant used in a nuclear reactor which is required to operate in space. It is another advantage of the present invention that it utilizes the surface tension of the liquid and requires no moving parts.

Broadly, the essence of the present invention resides in the use of the surface tension of a liquid to form a meniscus which acts as a gas-liquid interface, the meniscus providing a barrier to the passage or entrainment of gas into the liquid. Thus, in accordance with a particularly preferred embodiment, the apparatus comprises a plurality of elongated tubes which are supported at one end in a grid member. The grid member is in sealing engagement with the outer periphery of the tubes such that an interior passgeway through each of the tubes provides the sole fluid communication through the grid member. The apparatus further includes a vessel having outer walls which surround and are in sealing engagement with an outer periphery of the grid member. The vessel further includes a bottom member which is spaced apart from a face of the grid member opposite the tubes such that the wall member, bottom member and grid member form a liquid zone. A conduit member is provided for the introduction and withdrawal of liquid from said liquid zone. Located within the liquid zone, and extending at least part way into each of the tubes is a body of liquid, the surface tension of which forms a meniscus in each of the tubes. Each of the tubes also contains a body of a gas. The body of gas may be contained within each individual tube by sealing an end of the tube opposite the grid. Alternatively, the grid and tubes may be totally confined within the vessel.

DESCRIPTION OF THE PREFERRED EMBODIMENT

Figure 1:
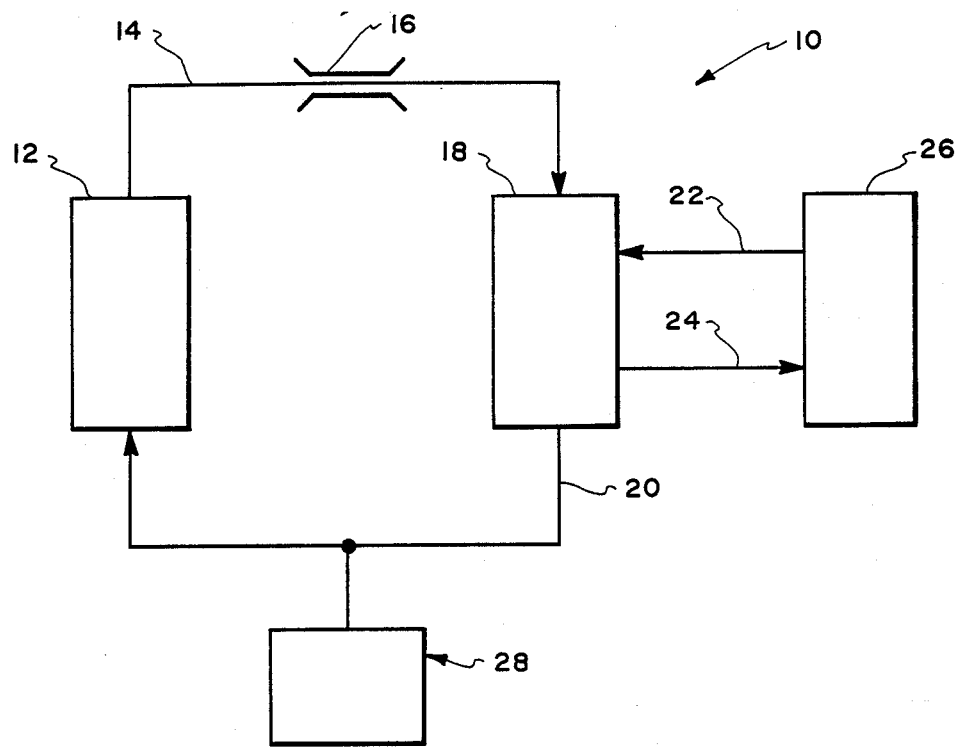
FIG. 1 is a schematic of a power generation system for use in a space environment utilizing the accumulator of the present invention.

Referring to FIG. 1 therein is depicted a schematic of a power system for use in a substantially zero gravity environment, such as an orbiting satellite or a spacecraft. The system includes a reactor 12 for heating a primary coolant fluid, a conduit 14 and a pump, typically an electromagnetic pump 16, for inducing a flow of heated primary fluid to a heat exchanger 18. A conduit 20 provides for return of the primary fluid to reactor 12. A working fluid is passed in indirect heat exchange relationship with the primary fluid via conduits 22 and 24 which circulate the working fluid through a power conversion system 26. Power conversion system 26 converts the heat in the working fluid to electrical energy for use, for example, as the source of power for data acquisition and transmission devices on an oribiting satellite.

The primary fluid flowing through reactor 12 may range in temperature by as much as 1,000K during normal operation. This temperature differential results in either thermal expansion or contraction of the fluid, thus it is essential there be provided means for accommodating such expansion and contraction. As depicted, this is accomplished by an accumulator 28 which is in fluid communication with conduit 20. It will be appreciated that the precise location is not critical and accumulator 28 could be placed in fluid communication with the primary fluid at any point in the system.

Figure 2:
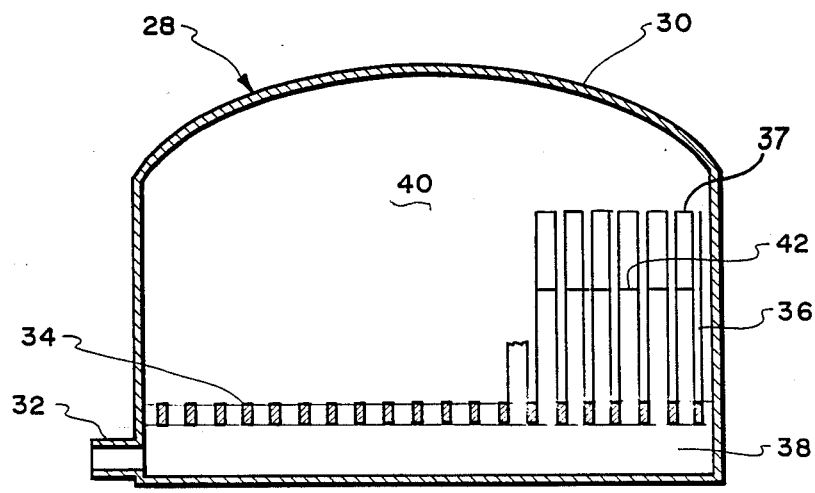
FIG. 2 is a cross-section schematic of an apparatus constructed in accordance with the present invention.

Referring now to FIG. 2, therein is depicted in cross-section a schematic of accumulator 28. In the preferred embodiment shown, accumulator 28 comprises a closed vessel 30 provided at an end thereof with a conduit 32. Located within vessel 30 is a grid plate 34 which is surrounded by and in sealing engagement with the walls of vessel 30. Grid plate 34 is provided with a plurality of openings, one for each tube, for receiving and supporting a plurality of tube members 36. Each of tube members 36 is provided with an internal passageway which provides the sole means of fluid communication between a liquid zone 38 and a gas zone 40. The apparatus further includes a body of liquid in liquid zone 38 which extends at least partially into each of tubes 36 wherein it is contained by capillary action. The surface tension of the liquid forms a meniscus in each tube which acts as a gas-liquid interface 42 forming a barrier to the body of gas contained in gas zone 40 and an upper portion of each of tubes 36. Alternatively, the body of gas may be contained within each individual tube by sealing an end 37 of the tube 36.

Given the direction and intent of the present invention the precise size of the passageways within each of tubes 36 is readily determinable by the artisan. For the containment of the liquid metal in a substantially zero gravity environment, tubes 36 will typically have an internal diameter within the range of from about 0.5 to 10 millimeters. In selecting the precise size, consideration must be given of course, to the acceleration forces to which the apparatus will be exposed during operation as well as the direction of such forces. In a similar manner, the length and nubmer of tubes will be determined by the volume of liquid which must be accommodated. In addition, in some instances, to assist the apparatus in withstanding higher acceleration loadings, a screen could be placed beneath grid member 34. When a screen is used, it will typically have a size of from about 30×30 to 500×500 mesh standard sieve size.

The operation of the device depicted in FIG. 2 will be described with reference to a particularly preferred application, namely, accommodating the thermal expansion of a primary coolant for a nuclear reactor required to operate in a substantially zero gravity environment. Typically, the coolant for such a reactor will be a liquid metal such as sodium, potassium, lithium or a mixture of sodium and potassium. Conduit 32 is placed in fluid communication with the primary coolant loop. Upon thermal expansion of the coolant, it will flow into liquid zone 38 displacing that coolant previously there and compressing the gas in gas zone 40. Generally the gas will be one of more of the inert gases from group VIIIa of the Periodic Table of the Elements. The more common gases for such use are helium and xenon or mixtures thereof. When the reactor output power is reduced, the coolant temperature will decline and the volume of coolant contract. At that time, the gas in gas zone 40 will expand pushing the liquid back through conduit 32 and back into the system from which it was drawn.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An accumulator whose principal purpose is to allow for thermal expansion of a liquid where said accumulator is adapted to operate in a zero gravity environment comprising:

a single closed vessel containing a plurality of elongated tubes, each tube having a fluid passageway therethrough for capillary containment of said liquid;

a grid member having openings therein for receiving one end of each of said tubes in sealing engagement such that the passageways in said tubes provide the sole means for fluid communication through said grid plate;

a housing having wall members surrounding the periphery of and in sealing engagement with said grid plate and a base member, said wall member, base member and grid member forming a liquid zone;

a body of said liquid in said liquid zone and extending partially into each of said tubes;

a body of gas contained in an opposite end of said tubes; and a conduit means located adjacent said base member of said vessel for the introduction of said liquid into and withdrawal of said liquid from said liquid zone to accommodate thermal expansion and contraction respectively of said liquid.

2. The accumulator of claim 1 wherein said liquid is a liquid metal and said gas is an inert gas.

3. The accumulator of claim 1 wherein each of said tubes has an internal diameter within the range of from about 0.5 to 10 millimeters.

4. The accumulator of claim 1 wherein said tubes and grid member are totally enclosed within said housing.

5. The accumulator of claim 1 wherein each of said tubes are closed at an end opposite said grid member for containing said body of gas.

6. The accumulator of claim 1 wherein said conduit means is in fluid communication with the primary coolant of a liquid metal-cooled nuclear reactor required to operate in a space environment.

7. The accumulator of claim 2 wherein each of said tubes has an internal diameter within the range of from about 0.5 to 100 millimeters.

8. The accumulator of claim 7 wherein said tubes and grid member are totally enclosed within said housing.

9. The accumulator of claim 7 wherein each of said tubes are closed at an end opposite said grid member for containing said body of gas.

10. The accumulator of claim 8 or 9 wherein said conduit means is in fluid communication with the primary coolant of a liquid metal-cooled nuclear reactor required to operate in a space environment.

* * * * *